US 8,744,086 B2

(12) United States Patent
Englund et al.

(10) Patent No.: US 8,744,086 B2
(45) Date of Patent: Jun. 3, 2014

(54) METHOD AND APPARATUS FOR DISTRIBUTING A QUANTUM KEY

(71) Applicant: The Trustees of Columbia University in the City of New York, New York, NY (US)

(72) Inventors: Dirk R. Englund, New York, NY (US); Jacob Mower, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 13/646,545

(22) Filed: Oct. 5, 2012

(65) Prior Publication Data

US 2013/0089206 A1 Apr. 11, 2013

Related U.S. Application Data

(60) Provisional application No. 61/543,691, filed on Oct. 5, 2011.

(51) Int. Cl.
*H04L 9/08* (2006.01)
(52) U.S. Cl.
USPC ........................................................ 380/278
(58) Field of Classification Search
USPC ........................................................ 380/278
See application file for complete search history.

(56) References Cited

U.S. PATENT DOCUMENTS

| 6,895,092 B2 * | 5/2005 | Tomita | 380/278 |
| 6,960,779 B2 * | 11/2005 | Shields et al. | 257/13 |
| 7,292,342 B2 * | 11/2007 | Zaugg | 356/451 |
| 2005/0254593 A1 * | 11/2005 | Moser et al. | 375/295 |

OTHER PUBLICATIONS

"Distribuion of Time—Energy Entanglement over 100km fiber using superconducting single—photon detectors," by Qiang, Zhang, Hiroki, Takesue, Sae Woo Nam, Carsten Langrock, Xiuping Xie, M.M. Fejer, Yoshihisa Yamamoto. Edward L. Ginzton Laboratory, Standford University, Standford, California 94305. Copyright 2007 Optical Society of America.*
"Frequency—bin entangled photons," by L. Olislager, J. Cussey, A.T. Nguyen, P. Emplit, S. Massar, J.-M. Merolla, and K. Phan Huy. Universitie' Libre de Bruxelles, Ave. F.D., Roosevelt 50, B-1050 Brussels, Belgium. (Received Jul. 8, 2009; Published Jul. 6, 2010).*
Bennett, C. & Brassard, G. "Quantum cryptography: Public key distribution and coin tossing." In Proceedings of IEEE International Conference on Computers, Systems, and Signal Processing, (1984) 175-179 (IEEE, New York).
Bechmann-Pasquinucci, H. & Tittel, W. Quantum cryptography using larger alphabets. Phys. Rev. (2000) A 61, 062308. URL http://link.aps.org/doi/10.1103/PhysRevA.61.062308.

(Continued)

*Primary Examiner* — Dant Shaifer Harriman
(74) *Attorney, Agent, or Firm* — Lisa A. Chiarini; Walter M. Egbert, III; Hughes Hubbard & Reed LLP

(57) ABSTRACT

A method for distributing a quantum key is provided, including sending a first photon to a first receiver; sending a second photon to a second receiver, the first and second photons being a pair of time-energy entangled photons; and providing a coding scheme comprising a plurality of time bins and a plurality of frequency bins, wherein a combination of a time bin and a frequency bin corresponds to a character.

9 Claims, 4 Drawing Sheets

(56) References Cited

OTHER PUBLICATIONS

Ali-Khan, I., Broadbent, C. J. & Howell, J. C. "Large-alphabet quantum key distribution using energy-time entangled bipartite states." Phys. Rev. Lett. 98, (2007) 060503. URL http://link.aps.org/doi/10.1103/PhysRevLett.98.060503.

Barreiro, J. T., Wei, T.-C. & Kwiat, P. G. "Beating the channel capacity limit for linear photonic superdense coding." Nature Physics 4, (2008) 282-286.

Shih, Y. H. & Alley, C. O. "New type of Einstein-Podolsky-Rosen-Bohm Experiment Using Pairs of Light Quanta Produced by Optical Parametric Down Conversion." Phys. Rev. Lett. 61, (1988) 2921-2924.

Law, C. K. & Eberly, J. H. "Analysis and interpretation of high transverse entanglement in optical parametric down conversion." Phys. Rev. Lett. 92, (2004) 127903. URL http://link.aps.org/doi/10.1103/PhysRevLett.92.127903.

Lloyd, S., Shapiro, J. H. & Wong, F. N. C. "Quantum magic bullets by means of entanglement." J. Opt. Soc. Am. B 19, (2002) 312-318. URL http://josab.osa.org/abstract.cfm?URI=josab-19-2-312.

Hadfield, R. H. "Single-photon detectors for optical quantum information applications." Nature Photonics 3, (2009) 696.

* cited by examiner

US 8,744,086 B2

METHOD AND APPARATUS FOR DISTRIBUTING A QUANTUM KEY

CROSS REFERENCE TO RELATED APPLICATIONS

This application claims priority to U.S. provisional application 61/543,691 filed Oct. 5, 2011, which is incorporated by reference in its entirety herein.

FIELD

The disclosed subject matter generally relates to integrated optical systems. More particularly, the disclosed subject matter relates to a new design for a photonic crystal useful for a wide variety of applications.

BACKGROUND

Quantum key distribution (QKD) enables two parties to establish a secure key at a distance, even in the presence of one or multiple eavesdroppers. The key can then be used to secretly transmit information using unconditionally secure one-time pad encryption. Unconditional security is achieved by the laws of physics rather than by assumptions about the computational abilities of the eavesdropper. Various QKD protocols have been proposed and implemented. A first protocol due employed polarization states of photons passed between the two parties. There has been growing interest in schemes employing photons in Hilbert spaces of high dimension, resulting in a potentially very large alphabet size. Different degrees of freedom have been considered, including polarization, time, and spatial modes.

What is needed is a protocol that allows two parties to generate their secure key at the maximum rate allowed using the time-energy basis. Moreover, a protocol is needed that is compatible with fiber-based dense WDM (DWDM) systems commonly used in classical fiber communications. It is also desirable to have an extremely compact, stable, and scalable platform for the protocol's implementation.

SUMMARY

A method for distributing a quantum key is provided, including sending a first photon to a first receiver; sending a second photon to a second receiver, the first and second photons being a pair of time-energy entangled photons; and providing a coding scheme comprising a plurality of time bins and a plurality of frequency bins, wherein a combination of a time bin and a frequency bin corresponds to a character.

In some embodiments, the first photon and the second photon are sent via optical fiber. In some embodiments, the first photon and the second photon are sent via a photonic integrated chip. In some embodiments, the first photon and the second photon are sent through free space.

A method for distributing a quantum key is provided including generating a plurality of pairs of time-energy entangled photons; for each pair of time-energy entangled photons, sending one photon to the first receiver and one photon to the second receiver; and providing a coding scheme comprising a plurality of time bins and a plurality of frequency bins wherein each pair of one of the plurality of time bins and one of the plurality of frequency bins corresponds to one of a plurality of characters.

A method of receiving a quantum key is provided including receiving a first photon, the first photon being one of a pair of time-energy entangled photons; detecting a time of arrival of the first photon; detecting a frequency of the first photon; and determining a character based on the detected time and frequency of the first photon.

In some embodiments, the determining a character step further comprises: assigning the detected time to a time bin; assigning the detected frequency to a frequency bin; and determining the character from a coding scheme based on the time bin and the frequency bin.

In some embodiments, the method further includes detecting whether an eavesdropper has detected the first photon by determining the frequency distribution of the first photon.

A method of receiving a quantum key is provided including receiving a plurality of photons, each of the plurality of photons being one of a pair of time-energy entangled photons; detecting the time of arrival of each of the plurality of photons; detecting the frequency of each of the plurality of photons; and determining a character based on the detected time and frequency of each of the plurality of photons.

An apparatus for receiving a quantum key is provided including a channel configured to receive photons; a plurality of multi-channel filtering elements, each corresponding to a frequency and each configured to pass photons within a range of its corresponding frequency; and a plurality of photon detectors, each configured to receive photons passed by one of the plurality of multi-channel filtering elements and to send an indication of photon detection.

DETAILED DESCRIPTION OF EXEMPLARY EMBODIMENTS

Figure 1C:
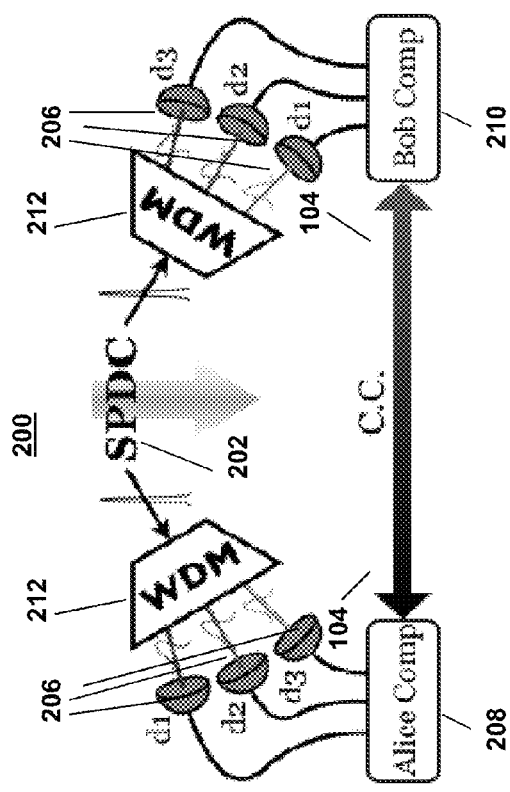
FIG. 1(c) illustrates a further system using the time-coding scheme in accordance with exemplary embodiments of the disclosed subject matter.

It is understood that the subject matter described herein is not limited to particular embodiments described, as such may, of course, vary. It is also understood that the terminology used herein is for the purpose of describing particular embodiments only, and is not intended to be limiting, since the scope of the present subject matter is limited only by the appended claims. Where a range of values is provided, it is understood that each intervening value between the upper and lower limit of that range, and any other stated or intervening value in that stated range, is encompassed within the disclosed subject matter.

Unless defined otherwise, all technical and scientific terms used herein have the same meaning as commonly understood by one of ordinary skill in the art to which this disclosed subject matter belongs. Although any methods and materials similar or equivalent to those described herein can also be used in the practice or testing of the present disclosed subject matter, this disclosure may specifically mention certain exemplary methods and materials.

All publications mentioned in this disclosure are, unless otherwise specified, incorporated by reference herein for all purposes, including, without limitation, to disclose and describe the methods and/or materials in connection with which the publications are cited.

The publications discussed herein are provided solely for their disclosure prior to the filing date of the present application. Nothing herein is to be construed as an admission that the present disclosed subject matter is not entitled to antedate such publication by virtue of prior invention. Further, the dates of publication provided may be different from the actual publication dates, which may need to be independently confirmed.

As used herein and in the appended claims, the singular forms "a," "an" and "the" include plural referents unless the context clearly dictates otherwise.

Nothing contained in the Abstract or the Summary should be understood as limiting the scope of the disclosure. The Abstract and the Summary are provided for bibliographic and convenience purposes and due to their formats and purposes should not be considered comprehensive.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosed subject matter. Any recited method can be carried out in the order of events recited, or in any other order that is logically possible.

Reference to a singular item includes the possibility that there are plural of the same item present. When two or more items (for example, elements or processes) are referenced by an alternative "or," this indicates that either could be present separately or any combination of them could be present together, except where the presence of one necessarily excludes the other or others.

As summarized above and as described in further detail below, in accordance with the various embodiments of the present invention, a large-alphabet protocol is described herein referred to as a 'Wavelength Division Multiplexed Quantum Key Distribution' (WDM-QKD) that employs time-energy entangled photon pairs. Given a certain photon flux n and channel bandwidth $\Delta\Omega$, WDM-QKD allows two parties, e.g., "Alice and Bob," to generate their secure key at the maximum rate allowed using the time-energy basis. WDM-QKD forms the quantum-cryptography analog of present-day WDM systems and is compatible with fiber-based dense WDM (DWDM) systems commonly used in classical fiber communications. An implementation of WDM-QKD is described herein as both a modern fiber optic network and in a photonic integrated chip (PIC). The latter provides an extremely compact, stable, and scalable platform for the protocol's implementation.

WDM-QKD enables Alice and Bob to generate their shared key at a maximum rate of n $\log_2(\Delta\Omega/n)$ at $\log_2(\Delta\Omega/n)$ bits per photon (bpp), using present-day single photon counters, WDM equipment, and simple components such as beam splitters or directional couplers. The information per photon per bandwidth is $\log_2 (\Delta\Omega/n)/\Delta\Omega$.

QKD protocols derive security from the fact that a measurement changes an unknown state if measured in a conjugate basis. If Alice and Bob employ two conjugate bases, they can detect a measurement by a third party eavesdropper, "Eve," including quantum nondemolition measurements. In the protocol described herein, the conjugate bases are time and energy. Alice and Bob make time and energy measurements using an extended Franson interferometer. Assuming 400 wavelength channels with detectors having 40 ps jitter, it is expected that for a bandwidth $\Delta\Omega=10$ nm around 1550 nm, Alice and Bob can generate a key at a maximum of 10 Tera bits per second (Tbps) at 1 bit per photon (bpp); or at 10 bpp and 100 Gbps; or at 200 Mbps at 20 bpp.

Time-energy entangled photon pairs with correlation time $\sigma_{cor}$ generated by spontaneous parametric down conversion (SPDC) were considered herein, assuming a pump field at frequency $\omega_p$ with coherence time $\sigma_{coh}$. The photon pair wave function can be written as $$|\Psi\rangle = \int_{-\infty}^{\infty}\int_{-\infty}^{\infty} \psi(t_A,t_B)|t_A,t_B,o_A,o_B\rangle dt_A dt_B \quad (1)$$

$$|t_A,t_B,o_A,o_B\rangle = \hat{a}_{o_A}^\dagger(t_A)\hat{a}_{o_B}^\dagger(t_B)|0\rangle$$

$$\psi(t_A,t_B) \propto e^{-(t_A-t_B)^2/4\sigma_{cor}^2} e^{-(t_A+t_B)^2/16\sigma_{cor}^2} e^{i\omega_p/2(t_A+t_B)}$$

The creation operator $\hat{a}_{o_i}^\dagger(t_j)$ denotes creation in spatial mode $o_i$ at time $t_j$. If the correlation time of the photons is sufficiently smaller than the time bin duration, Alice and Bob can establish a secret key using the correlated photon arrival time. A schematic of this protocol is shown in FIG. 1. The continuous biphoton wave function can be discretized as a sum over time bins $|\sigma_{bin}^i\rangle$ of duration $\sigma_{bin}$ as $$|\Psi\rangle = \sum_{i=-\infty}^{\infty} \sum_{j=-\infty}^{\infty} G^{i,j}|\sigma_{bin}^i, \sigma_{bin}^j\rangle \quad (2)$$

$$G^{i,j} = \int_{i\sigma_{bin}}^{(i+1)\sigma_{bin}} \int_{j\sigma_{bin}}^{(j+1)\sigma_{bin}} \psi(t_A,t_B) dt_A dt_B.$$

The probability that Alice and Bob project into time bins $\sigma_{bin}^i$ and $\sigma_{bin}^j$ is therefore $p^{i,j} = |\langle \sigma_{bin}^i, \sigma_{bin}^j|\overline{\psi}\rangle|^2 = |G^{i,j}|^2$. Detector jitter of magnitude $\sigma_{det}$ influences the fidelity of this projection, so that roughly $\sigma_{bin} > \sigma_{det}$ for reliable communication. Jitter therefore reduces the maximum number of characters to $\sigma_{coh}/\sigma_{det}$ from the maximum allowed, given by the Schmidt number, $K \approx \sigma_{coh}/\sigma_{cor}$. The fastest single photon detectors provide $\sigma_{det} \approx 40$ ps, whereas $\sigma_{cor}$ can be on the order of 10 fs–1 ps.

Figure 1D:
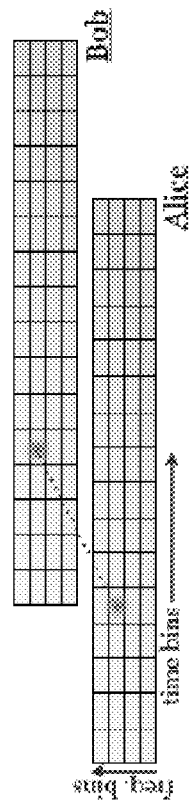
FIG. 1(d) illustrates time bins in accordance with exemplary embodiments of the disclosed subject matter.
Figure 1A:
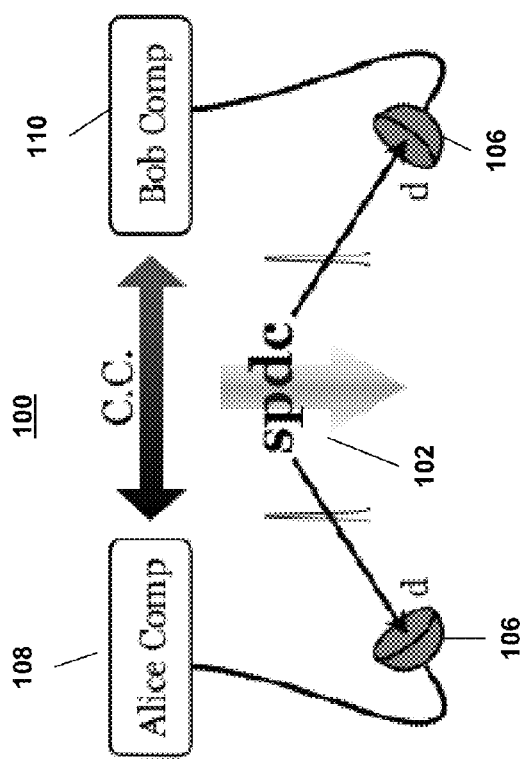
FIG. 1(a) illustrates a system using the time-coding scheme in accordance with exemplary embodiments of the disclosed subject matter.
Figure 1B:
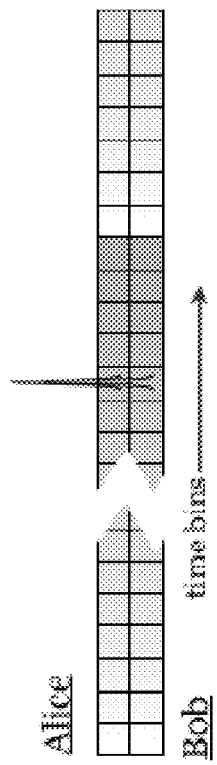
FIG. 1(b) illustrates time bins in accordance with exemplary embodiments of the disclosed subject matter.

FIG. 1(a) illustrates a system 100 using the time-coding scheme. A strong laser (not shown) pumps a nonlinear crystal. Photons pairs are generated by SPDC 102 and sent across channels of equal length to detectors 106 of Alice's computer 108 and Bob's computer 110 who measure their arrival times. FIG. 1(b) illustrates time bins agreed upon by Alice and Bob over a public channel. If a photon pair is detected in a given time bin, then that character is shared between Alice and Bob. FIG. 1(c) illustrates a system 200 in which photons pairs are also generated by SPDC 202. Alice's computer 208 and Bob's computer 210 include a grating, dispersive element or multi-channel filter 212 before their detectors 206 to obtain frequency information. FIG. 1(d) illustrates time bins.

For technological reasons, detector jitter is unlikely to approach the sub-ps regime in the near future. To overcome the technological mismatch between photon correlation time and detector jitter, the protocol described herein utilizes the circumstance that photons are not only entangled in time, but also in frequency. The biphoton wave function in the frequency domain, $|\Psi_F\rangle = FT_2|\Psi\rangle$, where $FT_2$ denotes the two-dimensional Fourier transform. Therefore, $|\Psi_F\rangle = \iint \psi(\omega_A, \omega_B) |\omega_A, \omega_B, o_A, o_B\rangle d\omega_A d\omega_B$, where $\psi(\omega_A, \omega_B) \alpha \exp[-\sigma_{cor}^2/4(\omega_A-\omega_B)^2] \exp[-\sigma_{coh}^2/4(\omega_A+\omega_B-\omega_p)^2]$.

States of this form show non-local frequency correlations. Thus, if Alice measures a frequency $\omega_A$ on one photon, then Bob must measure a frequency $\omega_B \approx \omega_p - \omega_A$ on the other, where $\omega_B = \omega_p - \omega_A$ for $\sigma_{coh} \to \infty$. If both Alice and Bob place multi-channel filtering elements before their detectors (as shown in FIG. 1(c)), then they can collect frequency information in addition to timing information. This filtering can be modeled as Gaussian projections onto discrete output spatial modes $|\zeta^i\rangle$ with frequency bandwidth $\delta v$ and center frequency $v_i$. Such filtering increases the correlation time of the photon pair, but this can be kept lower than the detector jitter to minimize the loss of timing information. Alternatively, one can increase the time bin duration $\sigma_{bin}$ to allow for smaller $\delta v$. Optimization of these parameters given limitations of the source and transmission channel are described below.

The QKD protocol is secure as discussed herein. Measurements of the frequency and creation time of the biphoton packet disturb its wave function in these bases; temporal positive operator valued measurements (POVM) reduce the coherence time while frequency POVMs increase the correlation time as discussed in greater detail below.

Alice and Bob can check the security of their channel by testing for changes in the correlation and coherence times. They use an extended Franson interferometer (eFI) 300/301, depicted in FIG. 2(a), in which photons pairs are also generated by SPDC 302. eFI 300/301 include, e.g., beam splitters BS 326, partial beam splitters PBS 328, and detectors 306. Measurement in Alice's and Bob's arm of the eFI are described by the annihilation operators for the long and short paths, with respective times $t_L^i$ and $t_S^i$, and i∈A, B denoting Alice and Bob: $\hat{a}A(tA) = 1/\sqrt{2}[\hat{a}A(t_L^A) + \hat{a}A(t_S^A)]$ and $\hat{a}B(tB) = 1/\sqrt{2}[\hat{a}B(t_L^B) + \hat{a}A(t_S^B)]$.

Figures 2A, 2B:
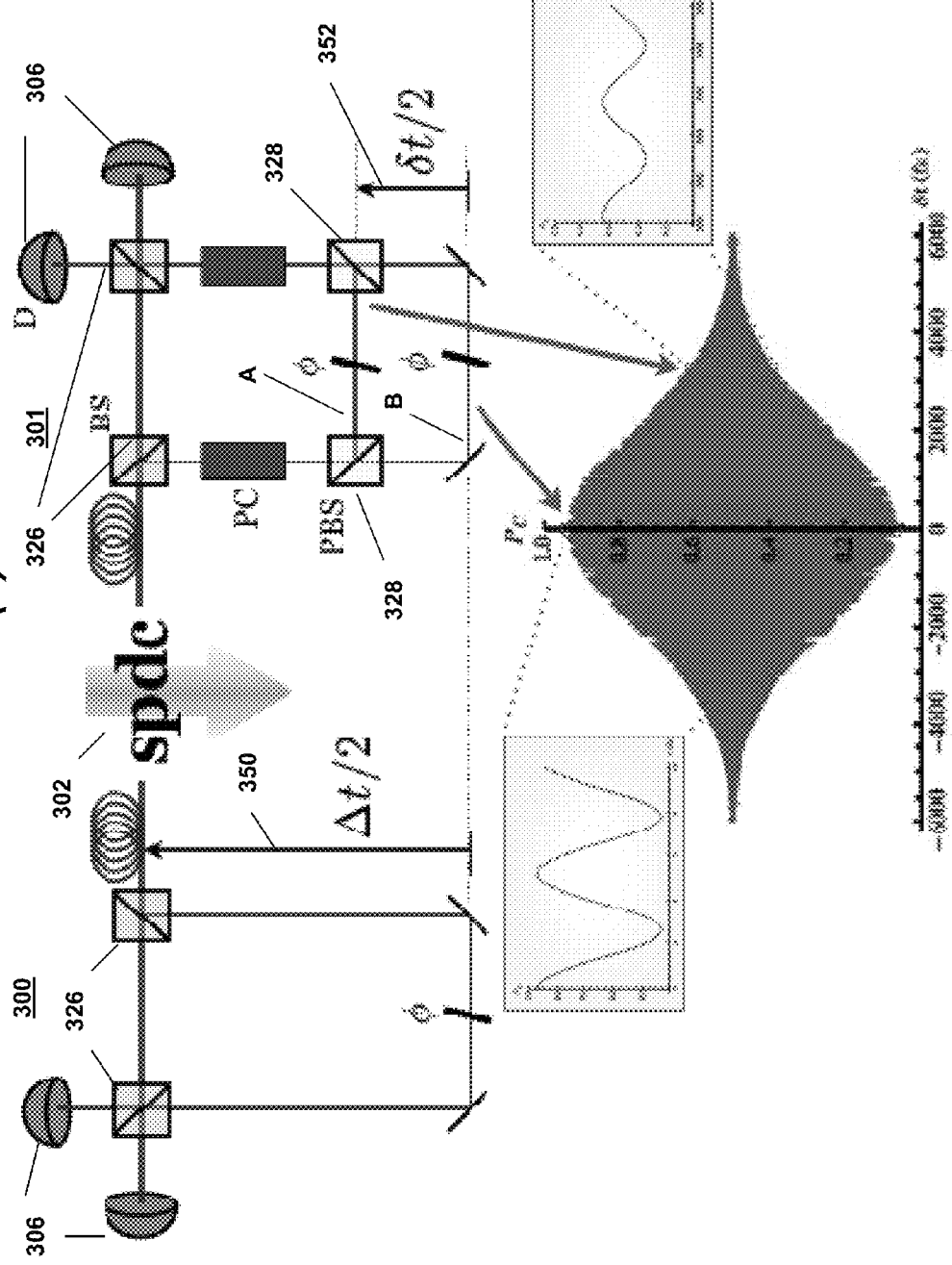
FIG. 2(a) illustrates Franson interferometers in accordance with exemplary embodiments of the disclosed subject matter.
FIG. 2(b) illustrates the coincidence counting probability $P_C$ displayed versus $\delta t$ in accordance with exemplary embodiments of the disclosed subject matter.

FIG. 2(a) illustrates for Bob's eFI 301, the short arm is switched between position A and B to achieve lengths $\delta t_1$ and $\delta t_2$. This allows determination of both and $\sigma_{cor}$ so that weak frequency and time measurements on the photon pair can be detected. FIG. 2(b) illustrates the coincidence counting probability $P_C$ displayed versus $\delta t$. For example, at position A, $\delta t = 0$ and $P_c = 1.0$.

These times are redefined using standard notation, where $\Delta t = (t_L^A - t_S^A)$ and $\delta t = (t_L^A - t_S^A) - (t_L^B - t_S^B)$. A selection is made to use $\Delta t$, $\Delta t - \delta t \gg \sigma_{cor}$ in order to avoid single photon interference between long and short paths of a single arm of the eFI. Selection of two different values, $\delta t_{1,2}$, is allowed by placing a switch in the long path of one arm of the eFI. The parameter $\delta t_{1,2}$ is then scanned to provide phase-dependent coincidence counting measurements. Alice and Bob measure the coincidence counting probability $P_G$, which evaluates to $P_c \propto 1/2 + 1/2 \cos[\omega(2\Delta t - \delta t)] e^{-\delta t^2/8\sigma_{coh}^2} e^{-\Delta t^2/8\sigma_{coh}^2}$ with visibility $V = e^{\delta t^2/8\sigma_{cor}^2} e^{-\Delta t^2/8\sigma_{coh}^2}$. The correlation time and coherence time can be deduced from two visibility measurements $V_1$ and $V_2$ using $\delta t_1$ and $\delta t_2$, respectively. These extrapolated values $\sigma_{coh}^{E'}$ and $\sigma_{cor}^{E'}$, are given by $$(\sigma_{cor}^{E'})^2 = \frac{1}{8} \frac{\delta t_1^2 - \delta t_2^2}{\ln V_1 - \ln V_2} \quad (3)$$

$$(\sigma_{coh}^{E'})^2 = \frac{1}{8} \frac{\Delta t^2(\delta t_1^2 + \delta t_2^2)}{\delta t_1^2 \ln V_2 - \delta t_2^2 \ln V_1} \quad (4)$$

The parameters $\langle \delta t \rangle$ and $\langle \delta t_2 \rangle$ are set so that $\langle \delta t \rangle - \langle \delta t_2 \rangle \approx \sigma_{cor}$ and $|\langle \delta t \rangle| \neq |\langle \delta t_2 \rangle|$ to sample the Franson curve at different points.

FIGS. 2(a) and 2(b) illustrate the choice of $\langle \delta t_1 \rangle = 0$ and $\langle \delta t_2 \rangle \approx \sigma_{cor}$. Using $(\sigma_{coh}^E)^2 = 1/[(\sigma_{coh}^{E'})^{-2} - \sigma_{coh}^{-2}]$ and $(\sigma_{cor}^E)^2 = 1/[(\sigma_{cor}^{E'})^{-2} - \sigma_{cor}^{-2}]$ derived from this measurement, the bound on Eve's information per photon is $I_E \leq \log_2(\sigma_{coh}/\sigma_{coh}^E) + \log_2(\sigma_{cor}^E/\sigma_{cor})$, which is the sum of her information obtained from temporal and frequency measurements. While all change in the wave function can be due to Eve's action, the analysis does not assume that Alice and Bob have perfect detectors or receive unaltered photon pairs. A more pessimistic calculation is required for the mutual information between Alice and Bob.

The probability of Alice and Bob measuring in frequency channels i and j and time bins k and l, is $p^{ijkl} = |\langle \zeta_A^i, \zeta_B^j, \sigma_{bin,A}^k, \sigma_{bin,B}^l | \Psi \rangle|^2 = |G^{ijkl}|^2$. These coefficients form a joint probability density function which can be used to compute the Shannon entropy $S = \Sigma_{ijkl} p^{ijkl} \log p^{ijkl}$ and mutual information $I(A, B) = S(A) + S(B) - S(A, B)$.

$$I(A, B) = -2 \sum_i |\Gamma^{ik}|^2 \log |\Gamma^{ik}|^2 + \sum_{i,j} |G^{ijkl}|^2 \log |G^{ijkl}|^2 \quad (5)$$

$$\Gamma_{ik} = \int_{k\sigma_{bin}}^{(k+1)\sigma_{bin}} \int_{-\infty}^{\infty} FT_2 \left[ \int_{i\delta v}^{(i+1)\delta v} \int_{-\infty}^{\infty} \psi(\omega_A, \omega_B) d\omega_A d\omega_B \right] dt_A dt_B$$

Detector jitter is included by operating a Gaussian spreading function on the biphoton state as $\hat{\sigma}_{det} = \int e^{-t_x^2/2\sigma_{det}^2} |t\rangle \langle t + t_x| dt_x$. FIG. 3 shows the mutual information as a function of the detector jitter normalized to the time bin duration, as discussed hereinbelow. The joint probability density function P of the new state, $|\Psi'\rangle = \hat{\sigma}_{det,A} \hat{\sigma}_{det,B} \{\hat{E}\} \hat{S}_B \hat{S}_A |\Psi_F\rangle$, incorporating the set of Eve's POVMs, $\{\hat{E}\}$, has elements $p^{ijkl} = |\langle \zeta_A^k \zeta_B^l, \sigma_{bin,A}^i, \sigma_{bin,B}^j | \Psi' \rangle|^2$.

Figures 3A, 3B:
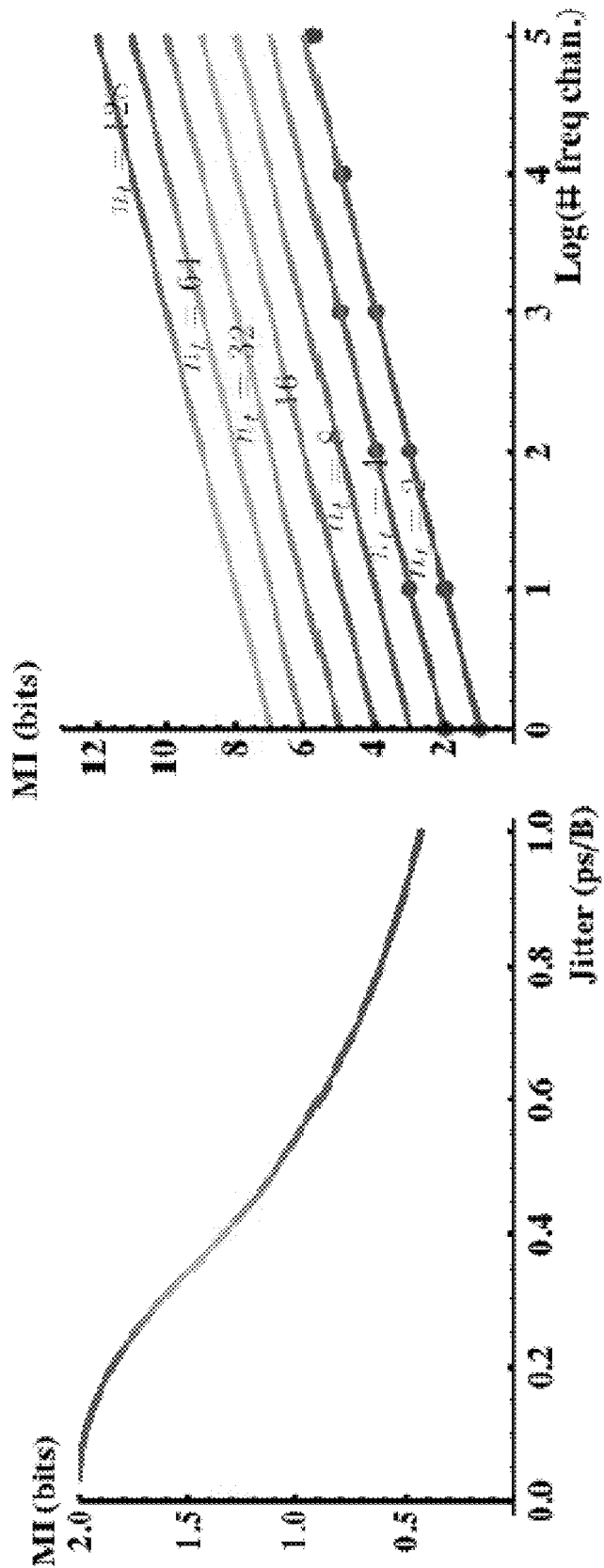
FIG. 3(a) illustrates mutual information as a function of detector jitter, $\sigma_{det}$, normalized to $\sigma_{bin}$ in accordance with exemplary embodiments of the disclosed subject matter.
FIG. 3(b) illustrates mutual information as a function of frequency channels, $n_f$, in accordance with exemplary embodiments of the disclosed subject matter.

FIG. 3(a) illustrates mutual information as a function of detector jitter, $\sigma_{det}$, normalized to $\sigma_{bin}$. FIG. 3(b) illustrates mutual information as a function of frequency channels, $n_f$. The individual frequency channels have bandwidth $\delta v = \Delta \omega / n_f$ and spacing $4\delta v$. Increasing the number of frequency channels increases the bits per photon, until the filter photon temporal bandwidth approaches $\sigma_{bin}$.

The number of time- and frequency-encoded bits given a photon budget and channel bandwidth can be optimized. For example, the photon budget is specific to the photon pair source and is given by the maximum emission rate, $R_v$. The allotted channel frequency bandwidth is $\Delta \Omega$. The frequency bandwidth of an individual photon pair source is $\Delta \omega \propto 1/\sigma_{cor}$, so the number of sources to fill the channel bandwidth is $N = \Delta \Omega / \Delta \omega$. The communication rate, $R_C$, in bits per second is therefore $$R_C = NR_v \log_2\left(\frac{\Delta\omega/\delta v}{R_v \sigma_{bin}}\right) \quad (6)$$

using $\sigma_{bin}$ and $\delta v$ defined above.

The often limited photon budget for quantum communication makes high-dimensional encoding desirable. However, achieving the limit on this dimensionality in the time domain using energy-time entangled photon pairs requires detectors with sub-ps timing jitter and resolution. By invoking conjugate frequency correlations, a protocol to approach this fundamental limit has been developed using current detectors and existing telecom networks. The conjugate nature of time and energy encoding means that one can trade frequency for temporal bits (and vice versa) to minimize the effect of channel distortion such as nonlinear frequency conversion and dispersion, in addition to optimizing over transmission rate and channel bandwidth.

Gaussian filtering functions are assumed with center frequencies $v_i$ and bandwidth $\delta v$, which project onto spatial modes $|\zeta_i\rangle$. This is summarized in the following relation, where the total filtering operator $\hat{S}$ is taken as a sum over the individual channel filters $\hat{S}^i$.

$$\hat{S} = \sum_i \hat{S}^i = \sum_i \int_{-\infty}^{\infty} \exp\left[\frac{-(\omega - v_i)^2}{2\delta v^2}\right] |\omega, \zeta^i\rangle\langle\omega, o|d\omega \quad (7)$$

Figure 4:
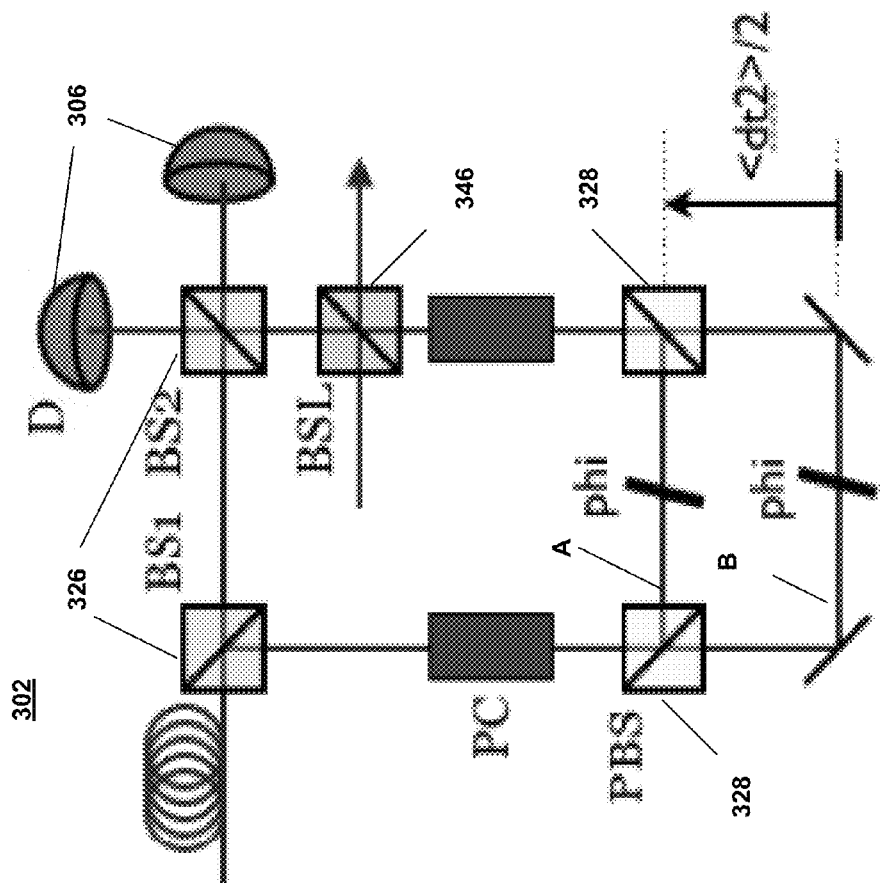
FIG. 4 illustrates a further Franson interferometer in accordance with exemplary embodiments of the disclosed subject matter.

The Franson interference derived hereinabove assumes lossless propagation through the interferometer. However, this assumption is not valid in photonic integrated chips or fiber networks. Loss can be taken into account by placing a beam splitter in the long path of the Franson, which couples the waveguide mode with a vacuum mode (see FIG. 4). Working in the Heisenberg construction, evolving the annihilation operator through the virtual loss beam splitter and the two Franson beam splitters. The matrix for beam splitters 1 and 2, which leave the third mode undisturbed is given by $$\hat{U}_i = \begin{pmatrix} \sqrt{r_i} & \sqrt{1-r_i} & 0 \\ \sqrt{1-r_i} & -\sqrt{r_i} & 0 \\ 0 & 0 & 1 \end{pmatrix} \quad (8)$$

where $i \in 1,2$. The virtual loss beam splitter is given by $$\hat{U}_L = \begin{pmatrix} 1 & 0 & 0 \\ 0 & \sqrt{r_L} & \sqrt{1-r_L} \\ 0 & \sqrt{1-r_L} & -\sqrt{r_L} \end{pmatrix} \quad (9)$$

The resulting annihilation operators are then $\hat{a}_A(t_A) = C_1 \hat{a}(t) + C_2 \hat{a}(t-\Delta t)$ and $\hat{a}_B(t_B) = C_1 \hat{a}(t) + C_2 \hat{a}(t-\Delta t - \delta t)$, disregarding the vacuum term, which will not affect coincidence counting. $C_1 = \sqrt{r_1}\sqrt{r_2}$ and $C_2 = \sqrt{1-r_1}\sqrt{1-r_2}\sqrt{r_L}$. For maximum visibility, $C_1 = C_2$, so $$\frac{\sqrt{r_1}}{\sqrt{1-r_1}} \frac{\sqrt{r_2}}{\sqrt{1-r_2}} = \sqrt{r_L} \quad (10)$$

This is plotted. For, $r_1 = r_2 = \frac{1}{2}$, the visibility simplifies to $$V_{PIC} = \frac{2e^{-2\Delta t/\tau_\alpha}}{1 + e^{-4\Delta t/\tau_\alpha}} e^{-\delta t^2/2\sigma_{cor}^2} e^{-\Delta t^2/2\sigma_{coh}^2} \quad (11)$$

where $\tau_\alpha$ is the photon lifetime in the waveguide due to loss.

Detector jitter refers to the added uncertainty in the photon detection time of some stimulus, purely a result of detector electronics. Superconducting nanowire single photon detectors and InGaAs APDs both exhibit jitter of roughly 30 to 40 ps. Detector jitter is modeled as a Gaussian projection, $\hat{\sigma}_{det} = \int e^{-t_x^2/2\sigma_{det}^2} |t\rangle\langle t+t_x|dt_x$. The jitter profile is not truly Gaussian and can be quite asymmetric, however this model allows for first-order analysis. If this is operated on both Alice and Bob's photons, assuming Eq. (1), $$\hat{\sigma}_{det,A}\hat{\sigma}_{det,B}|\Psi\rangle \propto \int_{-\infty}^{\infty}\int_{-\infty}^{\infty} \exp\left[\frac{-(t_A + t_B)^2}{4\sigma_{det}^2 + 16\sigma_{coh}^2}\right] \\ \exp\left[\frac{-(t_A + t_B)^2}{4\sigma_{det}^2 + 4\sigma_{cor}^2}\right] |t_A, t_B, o_A, o_B\rangle dt_A dt_B \quad (12)$$

Since $\sigma_{coh} \rangle \sigma_{det}$, the most important effect of jitter is to increase the observed correlation time roughly from $\sigma_{cor}$ to $\sigma_{det}$. This can have a significant effect on the mutual information between Alice and Bob if $\sigma_{det}$ is on the order of $\sigma_{bin}$, as shown in FIG. 3.

The case of a single eavesdropper measuring a single photon of the photon pair is considered herein. Eve's temporal measurement is a POVM that can be written as a Gaussian filtering function:

$$\hat{E}_t = \int_{-\infty}^{\infty} e^{-t^2/2(\sigma_{coh}^{E'})^2}|t\rangle\langle t|dt \quad (13)$$

Following, the amplitude function $\psi(t_A, t_B) \propto \exp[-(t_A - t_B)^2/4\sigma_{cor}^2]\exp[-t_A^2/4\sigma_{coh}^2]$ for $\sigma_{coh} \gg \sigma_{cor}$. Therefore $$|\Psi_E\rangle = \quad (14)$$
$$\hat{E}_t|\Psi\rangle \propto \int_{-\infty}^{\infty}\int_{-\infty}^{\infty} \exp\left[-t_A^2\left(\frac{1}{4\sigma_{coh}^2} + \frac{1}{4(\sigma_{coh}^{E'})^2}\right)\right]\exp\left[\frac{-(t_A - t_B)^2}{4\sigma_{cor}^2}\right]$$
$$|t_A, t_B, o_A, o_B\rangle dt_A dt_B$$

so the coherence time of the biphoton packet is strongly influenced by Eve's filtering bandwidth for $\sigma_{coh}^E \gg \sigma_{coh}$, which gives the bound on her timing information.

Similarly, a weak frequency POVM is defined, $$\hat{E}_\omega = \int_{-\infty}^{\infty} e^{-(\sigma_{cor}^{E'})^2(\omega - \omega_p/2)^2}|\omega\rangle\langle\omega|d\omega \quad (15)$$

For $1/\sigma_{cor} \gg 1/\sigma_{coh}$, and ignoring the spatial modes, $|\Psi_F\rangle$ can be written as $$|\Psi_F\rangle \approx \iint \exp[-\sigma_{cor}^2/4(2\omega_A - \omega_p)^2]\exp[-\sigma_{coh}^2(\omega_A + \omega_B - \omega_p)^2]|\omega_A, \omega_B\rangle d\omega_A d\omega_B. \quad (16)$$

$$\hat{E}_\omega|\Psi_F\rangle \approx \iint \exp[-(\sigma_{cor}^2/4 + (\sigma_{cor}^{E'})^2/4)(2\omega_A - \omega_p)^2] \times \exp[-\sigma_{coh}^2(\omega_A + \omega_B - \omega_p)^2]|\omega_A, \omega_B\rangle d\omega_A d\omega_B. \quad (17)$$

Thus, Eve projects the biphoton pair onto a narrower frequency distribution.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosed subject matter.

What is claimed is:

1. A method for distributing a quantum key, the method comprising:
   sending a first photon to a first receiver;
   sending a second photon to a second receiver, the first and second photons being a pair of time-energy entangled photons; and
   providing a coding scheme comprising a plurality of time bins and a plurality of frequency bins, wherein a combination of a time bin and a frequency bin corresponds to a character.

2. The method of claim 1 wherein the first photon and the second photon are sent via optical fiber.

3. The method of claim 1 wherein the first photon and the second photon are sent via a photonic integrated chip.

4. The method of claim 1 wherein the first photon and the second photon are sent through free space.

5. A method for distributing a quantum key, comprising:
   generating a plurality of pairs of time-energy entangled photons;
   for each pair of time-energy entangled photons, sending one photon to the first receiver and one photon to the second receiver; and
   providing a coding scheme comprising a plurality of time bins and a plurality of frequency bins wherein each pair of one of the plurality of time bins and one of the plurality of frequency bins corresponds to one of a plurality of characters.

6. A method of receiving a quantum key, comprising:
   receiving a first photon, the first photon being one of a pair of time-energy entangled photons;
   detecting a time of arrival of the first photon;
   detecting a frequency of the first photon; and
   determining a character based on the detected time and frequency of the first photon.

7. The method of claim 6 wherein the determining a character step further comprises:
   assigning the detected time to a time bin;
   assigning the detected frequency to a frequency bin; and
   determining the character from a coding scheme based on the time bin and the frequency bin.

8. The method of claim 6, further comprising:
   detecting whether an eavesdropper has detected the first photon by determining the frequency distribution of the first photon.

9. A method of receiving a quantum key, comprising:
   receiving a plurality of photons, each of the plurality of photons being one of a pair of time-energy entangled photons;
   detecting the time of arrival of each of the plurality of photons;
   detecting the frequency of each of the plurality of photons; and
   determining a character based on the detected time and frequency of each of the plurality of photons.

* * * * *